2 Sheets—Sheet 1.

J. B. D. BLACK.
Method of Marking the Keys of Keyboards for Musical Instruments.

No. 229,365. Patented June 29, 1880.

Witnesses
Fred. G. Dieterich
B. L. Dieterich.

Inventor:
J. B. D. Black.
by Louis Bagger & Co.
attorneys

J. B. D. BLACK.
Method of Marking the Keys of Keyboards for Musical Instruments.

No. 229,365.  Patented June 29, 1880.

UNITED STATES PATENT OFFICE.

JANE B. D. BLACK, OF GREEN HILL, TEXAS.

METHOD OF MARKING THE KEYS OF KEY-BOARDS FOR MUSICAL INSTRUMENTS.

SPECIFICATION forming part of Letters Patent No. 229,365, dated June 29, 1880.

Application filed February 14, 1880.

*To all whom it may concern:*

Be it known that I, JANE B. D. BLACK, of Green Hill, in the county of Titus and State of Texas, have invented certain new and useful Improvements in the Method of Marking the Keys of Key-Boards of Piano-Fortes and other Keyed Instruments; and I do hereby declare that the following is a full, clear, and exact description of the invention, which will enable others skilled in the art to which it appertains to make and use the same, reference being had to the accompanying drawings, which form a part of this specification, and in which—

Figure 1:
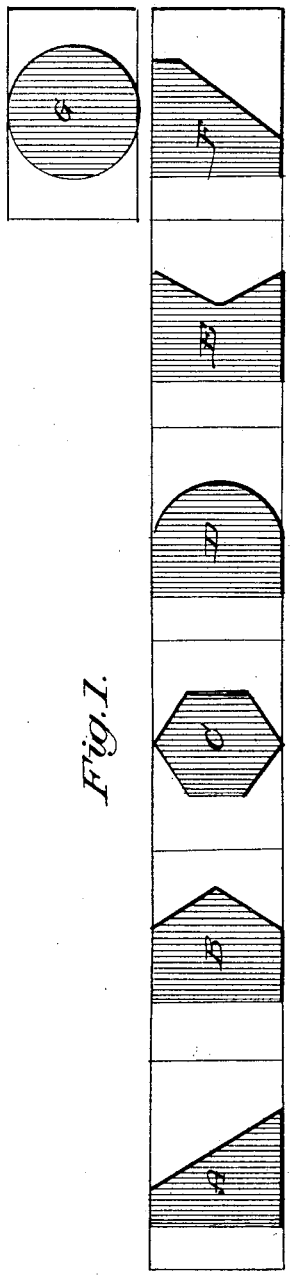
Figure 2:
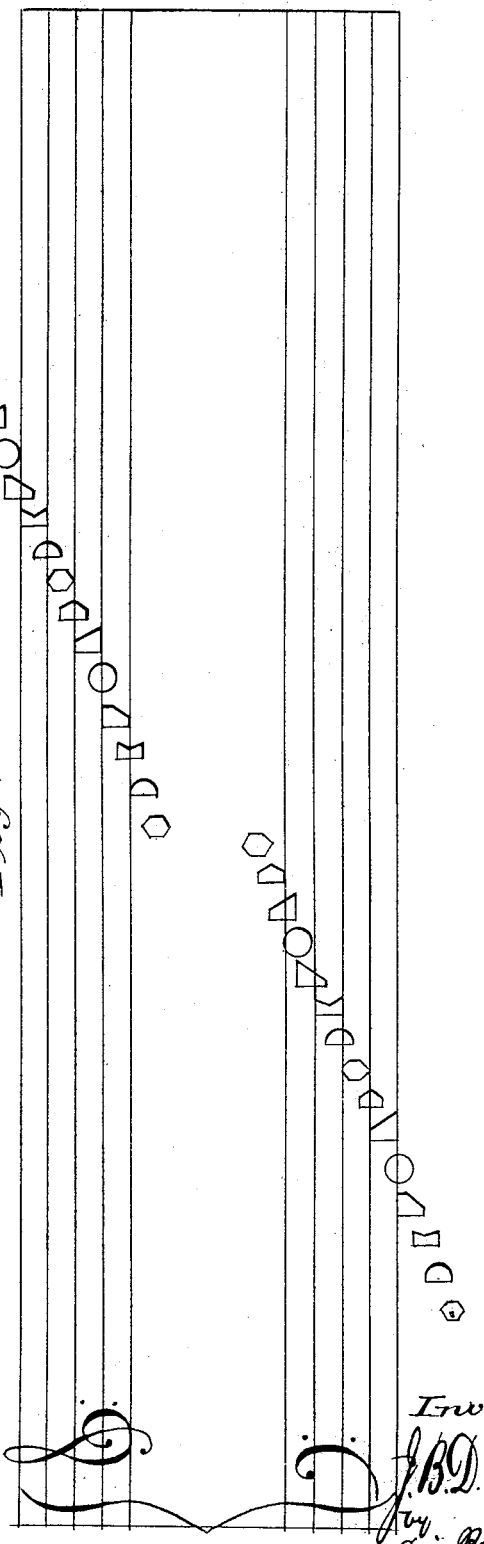
Figure 3:
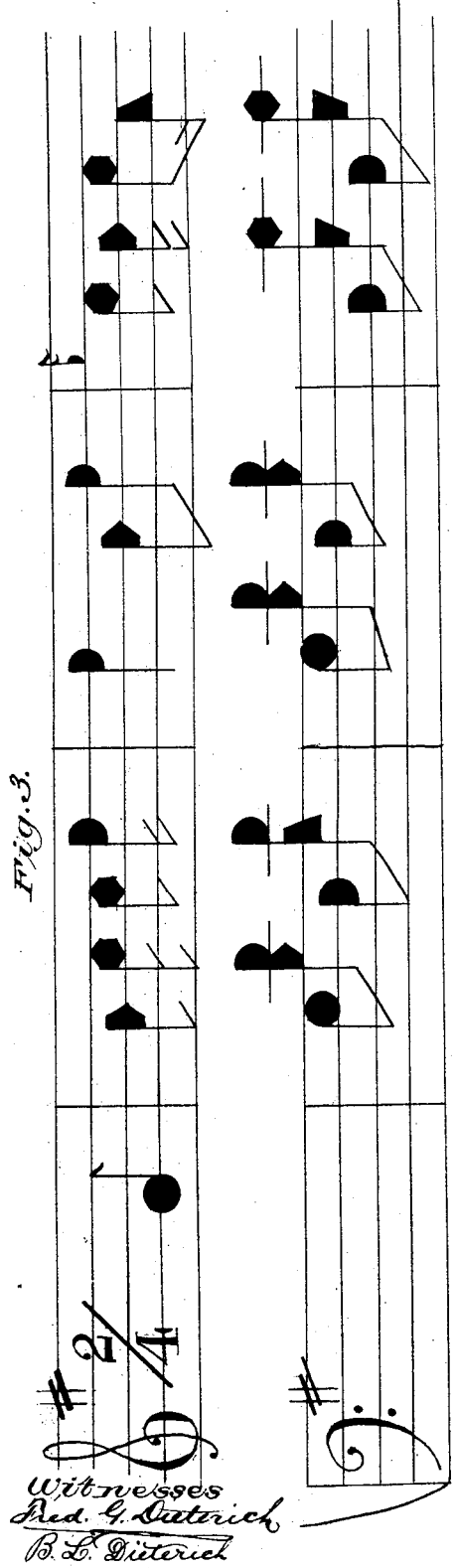
Figure 4:
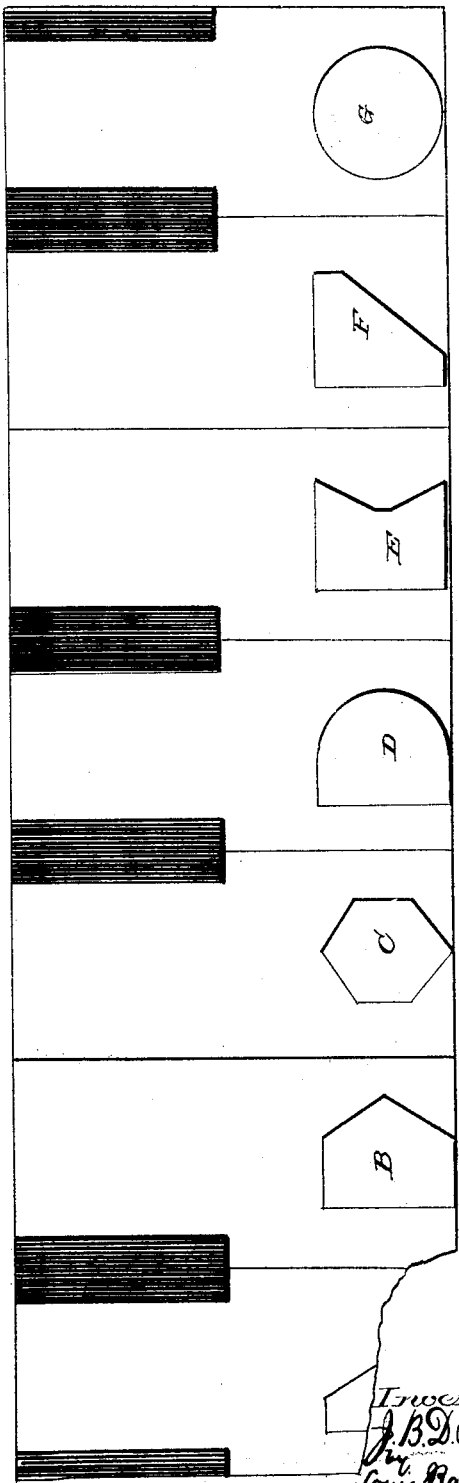

Figure 1 represents the system of musical notation upon which my invention is based. Fig. 2 represents this system as applied upon the staff from which the notes are read. Fig. 3 represents the opening bars of a piece of music—"Home, Sweet Home"—arranged for the piano or organ according to the said system of notation or method of designating the notes as illustrated in the foregoing figures; and Fig. 4 represents two octaves of the key-board of a piano, the keys of which are marked, in the manner hereinafter described, to correspond to the notes indicated by the aforesaid system of notation.

Similar letters of reference indicate corresponding parts in all the figures.

My invention has for its object to facilitate the teaching of music, especially with reference to piano-fortes, organs, and keyed instruments of a like nature, by marking the keys of the instrument in a manner to correspond to the notes which they represent; and for this purpose I employ a system of musical notation in which the several notes or note-symbols are shaped so as to approximate in appearance the shape of the letters from which they derive their appellations, substantially as hereinafter more fully set forth.

The said improved system of notation upon which my invention is based consists in making the outline of each note resemble the outline of that particular letter of the alphabet after which it is named, as will appear more clearly by reference to Fig. 1 of the drawings.

By making the notes in this manner suggest their own names or designations, their reading is greatly facilitated as compared with the arbitrary symbols in general use, while on the other hand their shape is not so different or remote from the old system as to make it difficult for those accustomed to that to read music which has been written or printed according to this improved system, and no one familiar with music will have any difficulty in reading the bars represented in Fig. 3 of the drawings.

To enable the pupils to find and fix in their memory the corresponding keys on the piano, I mark the white keys of this with symbols the shapes of which correspond to those of the notes they represent, as shown in Fig. 4. These symbols or figures may be made of any suitable black substance—such as india-rubber, thin leather or pasteboard, sticking-plaster, or any other suitable material that will present a slightly-raised surface to the touch of the pupil or performer; or, if preferred, the keys may be engraved or recessed to form the outline of the note-symbol and the recess filled with any suitable black substance or compound in a plastic state which, when dry, will be sufficiently hard to resist the wear caused by operating the keys in performing upon the piano or organ, as the case may be.

I have found by experience that the tedious task of teaching children to play the piano-forte is robbed of much of its difficulty by this method; also, that it requires the constant attention of the teacher in a less degree, because the pupils may practice by themselves, inasmuch as both the notes and the keys are marked with corresponding symbols indicative of their names.

I am aware that it is not new to employ in musical notation note-symbols having a contour like that of the letters from which they derive their nomenclature, nor do I claim such a system of notation; but

I claim as my invention and desire to secure by Letters Patent of the United States—

The described method of marking the keys of the key-board of a piano or organ, consisting in affixing upon each of the white keys in the octave a sign or symbol having a raised surface corresponding in outline to the shape of the note the name of which corresponds to that of the key, substantially as and for the purpose set forth.

In testimony that I claim the foregoing as my own I have hereto affixed my signature in presence of two witnesses.

JANE B. D. BLACK.

Witnesses:
JOHN N. GRIGSBY,
P. J. BLACK.